US006765053B2

(12) United States Patent
Labude et al.

(10) Patent No.: US 6,765,053 B2
(45) Date of Patent: Jul. 20, 2004

(54) DRAG-REDUCING POLYMER SUSPENSIONS

(75) Inventors: Katrina M. Labude, Tonkawa, OK (US); Kenneth W. Smith, Tonkawa, OK (US); Ray L. Johnston, Ponca City, OK (US)

(73) Assignee: ConocoPhillips Company, Bartlesville, OK (US)

( * ) Notice: Subject to any disclaimer, the term of this patent is extended or adjusted under 35 U.S.C. 154(b) by 0 days.

(21) Appl. No.: 10/396,660

(22) Filed: Mar. 25, 2003

(65) Prior Publication Data

US 2003/0187123 A1 Oct. 2, 2003

Related U.S. Application Data

(63) Continuation of application No. 09/723,571, filed on Nov. 23, 2000, now abandoned.

(51) Int. Cl.[7] .......................... C08L 33/00; C08L 31/04
(52) U.S. Cl. ...................... 524/521; 524/523; 524/524
(58) Field of Search .......................... 524/503, 521, 524/523, 524

(56) References Cited

U.S. PATENT DOCUMENTS

| | | | |
|---|---|---|---|
| 2,879,173 A | 3/1959 | Tacoe ........................... 117/16 |
| 2,895,939 A | 7/1959 | Stober et al. ............... 260/45.5 |
| 3,190,565 A | 6/1965 | Jayne ........................... 241/22 |
| 3,215,154 A | 11/1965 | White et al. .................. 137/13 |
| 3,351,601 A | 11/1967 | Blaga et al. ............... 260/28.5 |
| 3,528,841 A | 9/1970 | Donaldson et al. ........... 117/16 |
| 3,632,369 A | 1/1972 | Granville ..................... 117/16 |
| 3,687,699 A | 8/1972 | Prosser et al. ................. 117/4 |
| 3,692,675 A | 9/1972 | Nimerick ............... 252/8.55 E |
| 3,692,676 A | 9/1972 | Culter et al. .............. 252/8.55 |
| 3,730,275 A | 5/1973 | McClaflin et al. .......... 166/308 |
| 3,736,288 A | 5/1973 | Stratta et al. ........... 260/33.4 R |
| 3,739,991 A | 6/1973 | Wehren et al. ................ 241/45 |
| 3,771,729 A | 11/1973 | Grable ......................... 241/65 |
| 3,791,913 A | 2/1974 | Ver Strate et al. .......... 161/164 |
| RE28,361 E | 3/1975 | Hahn .......................... 117/16 |
| 3,884,252 A | 5/1975 | Kruka et al. .................. 137/13 |
| 3,928,263 A | 12/1975 | Grant .......................... 260/17 |
| 4,025,990 A | 5/1977 | Lovette ........................ 241/14 |
| 4,066,539 A | 1/1978 | Hachisu et al. ............... 210/36 |
| 4,147,677 A | 4/1979 | Lundberg et al. ........ 260/23.5 A |
| 4,151,135 A | 4/1979 | McClain ................... 260/23 R |
| 4,157,790 A | 6/1979 | Benn et al. .................... 241/22 |
| 4,166,043 A | 8/1979 | Uhlmann et al. ............ 252/300 |
| 4,171,056 A | 10/1979 | Hannon et al. ............... 215/12 |
| 4,233,365 A | 11/1980 | Karg ........................... 428/404 |
| 4,239,052 A | 12/1980 | McClaflin .................... 137/13 |
| 4,260,066 A | 4/1981 | Hannon et al. ............... 215/12 |
| 4,287,902 A | 9/1981 | McClaflin et al. ............ 137/13 |
| 4,289,679 A | 9/1981 | Mack ................... 260/33.6 PQ |
| 4,325,861 A | 4/1982 | Braun et al. ................. 523/205 |
| 4,333,488 A | 6/1982 | McClaflin .................... 137/13 |
| 4,340,076 A | 7/1982 | Weitzen ....................... 137/13 |
| 4,341,078 A | 7/1982 | Weitzen ........................ 62/48 |
| 4,345,013 A | 8/1982 | Diamond et al. ......... 430/106.6 |
| 4,355,651 A | 10/1982 | McClaflin .................... 137/13 |
| 4,358,572 A | 11/1982 | Mack et al. ................. 526/142 |
| 4,371,455 A | 2/1983 | Mack et al. ............. 252/429 C |
| 4,382,108 A | 5/1983 | Carroll et al. .............. 428/326 |
| 4,415,714 A | 11/1983 | Mack ......................... 526/125 |
| 4,420,400 A | 12/1983 | Weitzen ...................... 210/710 |
| 4,428,535 A | 1/1984 | Venetucci .................... 241/35 |
| 4,433,123 A | 2/1984 | Mack .......................... 526/139 |
| 4,440,916 A | 4/1984 | Waters et al. ............... 525/54.2 |
| 4,493,903 A | 1/1985 | Mack .......................... 502/121 |
| 4,493,904 A | 1/1985 | Mack .......................... 502/122 |
| 4,578,313 A | 3/1986 | Ito et al. ..................... 428/403 |
| 4,584,244 A | 4/1986 | Fenton ........................ 428/407 |
| 4,585,581 A | 4/1986 | Skotheim .................... 523/175 |
| 4,650,126 A | 3/1987 | Feder et al. ................... 241/22 |
| 4,693,321 A | 9/1987 | Royer .......................... 137/13 |
| 4,720,397 A | 1/1988 | O'Mara et al. .............. 427/180 |
| 4,756,326 A | 7/1988 | Johnston ...................... 137/13 |
| 4,771,799 A | 9/1988 | Baxter et al. ................. 137/13 |
| 4,771,800 A | 9/1988 | Pomeroy ..................... 137/13 |
| 4,789,383 A | 12/1988 | O'Mara et al. ................ 44/55 |
| 4,826,728 A | 5/1989 | O'Mara et al. .............. 428/407 |
| 4,837,249 A | 6/1989 | O'Mara et al. .............. 523/175 |
| 4,845,178 A | 7/1989 | Hostetler et al. ............ 526/153 |
| 4,881,566 A | 11/1989 | Ubels et al. .................. 137/13 |
| 4,945,142 A | 7/1990 | Gessell et al. ............... 526/128 |
| 4,952,738 A | 8/1990 | Gessell et al. ................. 585/3 |
| 5,027,843 A | 7/1991 | Grabois et al. ............... 137/13 |
| 5,165,441 A | 11/1992 | Mitchell ...................... 137/13 |
| 5,244,937 A | 9/1993 | Lee et al. .................... 523/204 |
| 5,276,116 A | 1/1994 | Gessell et al. ............... 526/128 |
| 5,376,697 A | 12/1994 | Johnston et al. ............ 523/175 |
| 5,430,118 A | 7/1995 | Powers et al. .............. 526/347 |
| 5,449,732 A | 9/1995 | Smith et al. ............... 526/348.3 |
| 5,504,131 A | 4/1996 | Smith et al. ................ 524/401 |
| 5,504,132 A | 4/1996 | Smith et al. ................ 524/401 |
| 5,539,044 A | 7/1996 | Dindi et al. ................. 524/570 |
| 5,654,361 A | 8/1997 | Gunesin et al. ............. 524/577 |
| 5,906,665 A * | 5/1999 | Trippe et al. ................ 44/459 |
| 5,942,461 A | 8/1999 | Brown et al. ............... 502/154 |
| 6,172,151 B1 | 1/2001 | Johnston et al. ............ 524/379 |

FOREIGN PATENT DOCUMENTS

| | | | |
|---|---|---|---|
| CA | 675522 | 12/1963 | ................. 241/135 |
| EP | 0017368 | 3/1980 | .................... 19/18 |
| GB | 1452146 | 12/1973 | ............ C08J/3/08 |

OTHER PUBLICATIONS

Weishaupt, Dr.–Ing. J. et al.; "Size–Reduction of Thermoplastic Materials at Low Temperature and the Economic Aspects," Linde Reports on Science and Technology., 15/1970.

(List continued on next page.)

Primary Examiner—Peter D. Mulcahy
(74) Attorney, Agent, or Firm—Lynda S. Jolly

(57) ABSTRACT

A drag-reducing polymer suspension is described, along with a method for manufacturing the drag-reducing polymer suspension. The drag-reducing suspension is easily transportable, non-hazardous, and easily handled. The drag-reducing suspension is manufactured by grinding an ultra-high molecular weight polymer with a wax crystal modifier and suspending it in a suspending fluid.

18 Claims, 1 Drawing Sheet

OTHER PUBLICATIONS

Bajaj, J.K.L., "Grinding the Tough Plastics At Cryogenic Temperatures," Plastics Design & Processing, Feb. 1977.

Biddulph, Michael W., "Coolers for cryogenic grinding," Chemical Engineering, Feb. 11, 1980.

N₂itro Grind Cryogenic Grinding Systems brochure, 1977 Liquid Carbonic Corporation Form No. 6625.

Simmonds, D.K., Air Products Limited (Publication and date unknown).

Frable, Norman B., "Keep Scrap Quality High with Cryogenic Grinding," Plastics Engineering, May 1976.

"Cryogenic Grinding System," Plastics & Rubber Weekly, Oct. 22, 1976.

"Cryogenic Grinding Gets a Lift from New Stress on Cost Reduction," Modern Plastics, Dec. 1977.

Disclosed Anonymously, Research Disclosure, Feb. 1984 "Agglomeration–free storage of polymeric dragreducers," Feb. 1984.

"Cryogenic Recycling Technology gets more Practical–Even for the Toughest Combinations of Materials," Modern Plastics, Jul. 1981.

Frable, Norman B., "Cryogenic Size Reduction of Plastics," Modern Plastics, May 1979.

Murtland, W.O., "Cryogrinding Scrap into Filler," Elastomerics, Mar. 1978.

Lester, C.B., "Drag–Reducing Agents–Conclusion," Oil & Gas Journal, Mar. 11, 1985.

Ricci, Larry J., "Cryogenic grinding: no quick thaw in CPI use," Chemical Engineering Jul. 4, 1973.

Oberpriller, Ing. Jakob; "Disintegration under Refrigeration of Substances with Poor Grinding Properties," Linde Reports on Science and Technology, 24/1976.

Frable, Norman B., Savage, Raymond W.;"Recycled scrap becomes valuable resource," Rubber World.

"Cryogenic Size–Reduction Technology Provides Economical Recycling Method," Elastomerics, Dec. 1977.

* cited by examiner

DRAG-REDUCING POLYMER SUSPENSIONS

This application is a Continuation Application of application Ser. No. 09/723,571 filed Nov. 23, 2000, now abandoned, the entirety of which is incorporated by reference.

FIELD OF THE INVENTION

The present invention relates to drag-reducing polymer suspensions and their method of manufacture. More specifically, this invention relates to a method for preparing suspensions of ultra-high molecular weight, substantially non-crystalline, hydrocarbon-soluble polymers and wax crystal modifier polymers with decreased dissolution time in solvent hydrocarbons flowing through conduits to enhance the effect of the drag-reducing polymers.

BACKGROUND OF THE INVENTION

A drag-reducing agent is one that substantially reduces the friction loss that results from the turbulent flow of a fluid. Where fluids are transported over long distances, such as in oil and other hydrocarbon liquid pipelines, these friction losses result in inefficiencies that increase equipment and operations costs. Ultra-high molecular weight polymers are known to function well as drag-reducing agents, particularly in hydrocarbon liquids. In general, drag reduction depends in part upon the molecular weight of the polymer additive and its ability to dissolve in the hydrocarbon under turbulent flow. Effective drag-reducing polymers typically have molecular weights in excess of five million.

Drag-reducing polymers are known in the art. Representative, but non-exhaustive, samples of such art are: U.S. Pat. No. 3,692,675, which teaches a method for reducing friction loss or drag for pumpable fluids through pipelines by adding a minor amount of a ultra-high molecular weight, non-crystalline polymer; and U.S. Pat. No. 3,884,252, which teaches the use of polymer crumb as a drag-reducing material. These materials are extremely viscoelastic and, in general, have no known use other than as drag-reducing materials. However, the very properties that make these materials effective as drag-reducing additives make them difficult to handle because they have a severe tendency to cold flow and reagglomerate, even at subambient temperatures. Under conditions of pressure, such as stacking or palleting, cold flow is even more intense and reagglomeration occurs very quickly.

The general propensity of non-crosslinked elastomeric polymers (elastomers) to cold flow and agglomerate is well-known. Polymers of this sort cannot be pelletized or put into discrete form and then stored for any reasonable period of time without the materials flowing together to form large agglomerates. Because of such difficulties, elastomers are normally shipped and used as bales. However, such bales must be handled on expensive equipment and cannot be pre-blended. In addition, polymers such as the drag-reducing additives described are not susceptible to such balings, since cold flow is extremely severe. Further, dissolution time for such drag-reducing materials from a polymer state in the flowing hydrocarbons to a dissolved state is so lengthy as to severely reduce the effectiveness of this material as a drag-reducing substance.

Numerous attempts have been made to overcome the disadvantages inherent in cold-flowing polymers. Representative, but non-exhaustive, of such art is that described in U.S. Pat. No. 3,791,913, wherein elastomeric pellets are surface cured, i.e., vulcanized to a minor depth in order to maintain the unvulcanized interior of the polymer in a "sack" of cured material, and U.S. Pat. No. 4,147,677, describing a method of preparing a free-flowing, finely divided powder of neutralized sulfonated elastomer by admixing with fillers and oils. This reference does not teach a method for making free-flowing powders of non-elastomeric material. U.S. Pat. No. 3,736,288 teaches solutions of drag-reducing polymers in inert, normally liquid vehicles for addition to liquids flowing in conduits. A "staggered dissolution" effect is provided by varying the size of the polymer particles. Suspension or surface-active agents can also be used. While directed to ethylene oxide polymers, the method is useful for hydrocarbon-soluble polymers as well. U.S. Pat. No. 4,088,622 describes a method of making an improved, molded drag-reducing coating by incorporating antioxidants, lubricants, and plasticizers and wetting agents in the form of a coating which is bonded directly onto the surface of materials passing through a liquid medium. U.S. Pat. No. 4,340,076 teaches a process for dissolving ultra-high molecular weight hydrocarbon polymer and liquid hydrocarbons by chilling to cryogenic temperatures comminuting the polymer formed into discrete particles and contacting these materials at near cryogenic temperatures with the liquid hydrocarbons to more rapidly dissolve the polymer. U.S. Pat. No. 4,341,078 immobilizes toxic liquids within a container by injecting a slurry of cryogenically ground polymer particles while still at cryogenic temperatures into the toxic liquid. U.S. Pat. No. 4,420,440 teaches a method for collecting spilled hydrocarbons by dissolving sufficient polymer to form a nonflowing material of semi-solid consistency by contacting said hydrocarbons with a slurry of cryogenically comminuted ground polymer particles while still at cryogenic temperatures.

Some current drag-reduction systems inject a drag-reducing polymer solution containing a high percentage of dissolved ultra-high molecular weight polymer into conduits containing the hydrocarbon. The drag-reducing polymer solution is normally extremely thick and difficult to handle at low temperatures. Depending upon the temperature of the hydrocarbon and the concentration at which the drag-reducing polymer solution is injected, significant time elapses before dissolution and resulting drag reduction. Solid polymers of these types can take days to dissolve in some cases, even though drag reduction is greatly enhanced once dissolution has finally occurred. Also, such ultra-high molecular weight polymer solutions become very viscous as polymer content increases, in some cases limiting the practical application of these solutions to those containing no more than about 15 weight percent polymer. This makes complex equipment necessary for storing, dissolving, pumping, and injecting metered quantities of drag-reducing material into flowing hydrocarbons.

Another way to introduce ultra-high molecular weight polymers into the flowing hydrocarbon stream is through a suspension. The ultra-high molecular weight polymers are suspended in a liquid that will not dissolve or will only partially dissolve the ultra-high molecular weight polymer. This suspension is then introduced into the flowing hydrocarbon stream. The tendency of the ultra-high molecular weight polymers to reagglomerate makes manufacture of these suspensions difficult. A way of controlling the tendency of the ultra-high molecular weight polymers to reagglomerate is to partially surround the polymer particles with a partitioning agent, occasionally termed a coating material, to reduce the ability of these polymers to reagglomerate. U.S. Pat. No. 4,584,244, which is hereby incorporated by reference, describes a process whereby the polymer is ground and then coated with alumina to form a free-flowing powder. Some processes using a partitioning agent require that the partitioning agent completely surround the polymer core, which requires that at least 20% and often as much as 50% of the weight of the final composition be the partitioning agent. Other examples of partitioning agents used in the art include talc, tri-calcium phosphate, calcined clay, calcium and magnesium stearate, silica, polyanhydride polymers, sterically hindered alkyl phenol antioxidants, and graphite. Partitioning agents, however, add weight to the drag-reducing agent material, resulting in higher transport costs and additional handling equipment, without any drag-reducing benefit. Further, some partitioning agents are incompatible with the hydrocarbon fluid or may be an unwanted contaminant in the hydrocarbon fluid.

SUMMARY OF THE INVENTION

Accordingly, a drag-reducing suspension and a method of producing a drag-reducing suspension are disclosed herein. One embodiment of the present invention is drawn to a drag-reducing polymer suspension composed of an ultra-high molecular weight polymer, a wax crystal modifier polymer, and a suspending fluid. In another embodiment, a method for the preparation of a drag-reducing polymer suspension is disclosed where an ultra-high molecular weight linear poly($\alpha$-olefin) is ground with a wax crystal modifier polymer at a temperature below the glass transition temperature of the ultra-high molecular weight linear poly($\alpha$-olefin) to form ground polymer particles. The ground polymer particles are then mixed with a suspending fluid to form the drag-reducing polymer suspension.

One advantage of the present invention is that the drag-reducing polymer suspension is easily transportable and does not require pressurized or special equipment for storage, transport, or injection. Another advantage is that the drag-reducing polymer is quickly dissolved in the flowing hydrocarbon stream. Yet another advantage of the present invention is that the extra bulk and cost associated with the inert partitioning agent may be reduced or eliminated, allowing easier transport. Still another advantage of the present invention is that reagglomeration of the drag-reducing polymers is greatly reduced, allowing for easier handling during manufacture. Another advantage of the present invention is that the drag-reducing polymer suspension is stable, allowing a longer shelf life and balancing of customer demand with manufacturing time. A further advantage of the present invention is that the amount of inert ingredients in the final product is reduced. Yet another advantage is that wax crystal modifier further reduces the drag of the hydrocarbon stream by lowering its pour point, reducing the viscosity of the hydrocarbon stream and thereby increasing the effectiveness of the drag-reducing agent.

DETAILED DESCRIPTION OF THE INVENTION

Figure 1:
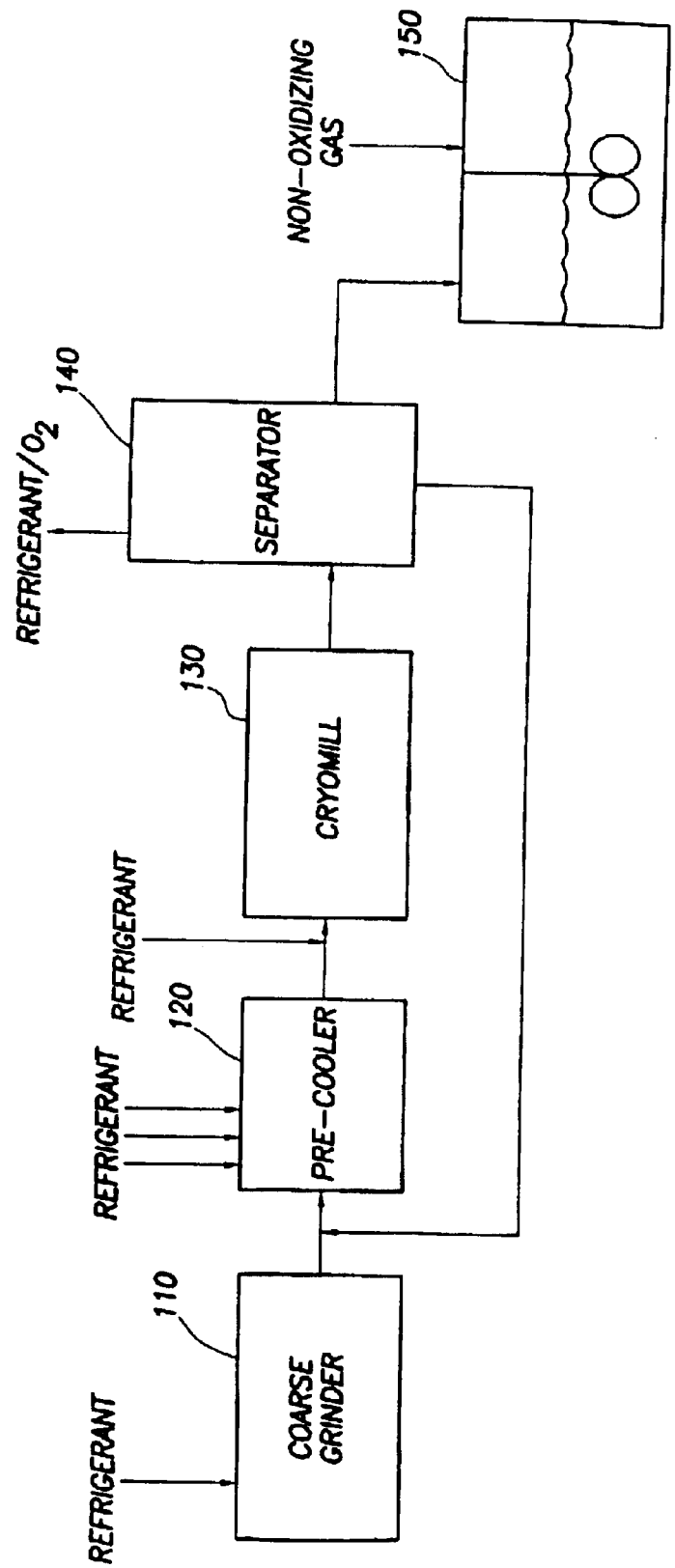
FIG. 1 is a schematic of the apparatus for manufacturing the drag-reducing polymer suspension.

In the present invention, ultra-high molecular weight polymers are ground at temperatures below the glass transition temperature of the polymer or polymer blends, and then mixed in a suspending fluid. These polymers are generally not highly-crystalline. Glass transition temperatures vary with the type of polymer, and typically range between −10° C. and −100° C. (14° F. and −148° F.). This temperature can vary depending upon the glass transition point of the particular polymer or polymer blend, but normally such grinding temperatures must be below the lowest glass transition point of any polymer that comprises a polymer blend.

A preferred ultra-high molecular weight polymer is typically a linear poly($\alpha$-olefin) composed of monomers with a carbon chain length of between four and twenty carbons or mixtures of two or more such linear poly($\alpha$-olefin)s. Typical examples of these linear poly($\alpha$-olefin)s include, but are not limited to, poly(1-octene), poly(1-nonene), and poly(1-decene). The ultra-high molecular weight polymer may also be a copolymer, i.e., a polymer composed of two or more different types of monomers, as long as all monomers used have a carbon chain length of between four and twenty carbons.

As shown in FIG. 1, the ultra-high molecular weight polymer and a wax crystal modifier polymer are conveyed to coarse chopper 110. The wax crystal modifier polymer may include one or more of the following: copolymers of olefins and acrylonitrile; copolymers of olefins, acrylonitrile, and vinyl acetate or carbon monoxide; polyalkylacrylates; copolymers of methacrylate and vinyl acetate; copolymers of olefins and vinyl acetate, such as ethylene-vinyl acetate copolymer; copolymers of olefins, vinyl acetate, and carbon monoxide, such as ethylene-vinyl acetate-carbon monoxide copolymer or propylene-vinyl acetate-carbon monoxide; and copolymers of olefins with maleic anhydride or maleic anhydride derivatives such as esters and imides such as ethylene-maleic anhydride copolymer. The wax crystal modifier polymer must be of sufficient hardness at the grinding temperature employed so as to allow grinding to less than 500 microns in diameter, typically to between 30 to 400 microns in diameter. Enough wax crystal modifier polymer should be added to coarse chopper 110 so that it forms a mixture of between 5% to 90% wax crystal modifier polymer to 10% to 95% ultra-high molecular weight polymer (all percentages in weight percent of the total mixture). These percentages may be adjusted by one of ordinary skill in the art depending on the application. The wax crystal modifier polymer may serve at least two purposes. First, it acts to partition the particles of ultra-high molecular weight polymer to prevent reagglomeration after chopping and grinding. Second, wax crystal modifier polymers may act to lower the pour point of the flowing hydrocarbon liquid. When the temperature of a hydrocarbon liquid such as crude oil, lubricating oil, or fuel oil is lowered, the waxes in these hydrocarbon liquids separate, reducing the ability of the hydrocarbon liquids to flow. A wax crystal modifier may act to modify the size and shape of the wax crystals, reducing the adhesive forces between the crystals, and between the crystals and the remainder of the hydrocarbon liquid. This reduction in adhesive forces allows the hydrocarbon liquid to remain fluid at lower temperatures and enhances the function of the drag-reducing agent by decreasing the viscosity of the flowing hydrocarbon liquid. The wax crystal modifier polymer is preferably added to coarse chopper 110 as a powder, or as small beads of 3 millimeters (⅛ inch) or less in diameter. The wax crystal modifier polymer added to coarse chopper 110 may help prevent reagglomeration of the ultra-high molecular weight polymer. Coarse chopper 110 chops large chunks of the ultra-high molecular weight polymer into small polymer pieces, typically between 1 to 1½ centimeters (⅜ inch to ⅝ inch) in diameter. While coarse chopper 110 may be operated at ambient temperatures, it is preferable to cool the polymer in coarse chopper 110 to between 5° C. to 15° C. (41° F. to 59° F.). The polymer in coarse chopper 110 may be cooled either internally or externally or both, with a liquid, gaseous, solid refrigerant or a combination thereof, but most commonly by spraying a liquid refrigerant into coarse-chopper 110, such as liquid nitrogen, liquid helium, liquid argon, or a mixture of two or more such liquid refrigerants, or by mixing the ultra-high molecular weight polymer with dry ice (solid carbon dioxide) with or without the above-mentioned liquid refrigerants. Partitioning agent may be added in coarse chopper 110 if required to prevent reagglomeration. However, it is preferred to avoid using partitioning agent in coarse chopper 110 in order to reduce the amount of inert material in the final suspension.

The wax crystal modifier and the small pieces of the ultra-high molecular weight polymer are mixed in coarse chopper 110 to form a polymer mixture. The polymer mixture formed in coarse chopper 110 is then transported to pre-cooler 120. This transport may be accomplished by any number of typical solids handling methods, but is most often accomplished through the use of an auger or a pneumatic transport system. Pre-cooler 120 may be an enclosed screw conveyor with nozzles for spraying a liquid refrigerant, such as liquid nitrogen, liquid helium, liquid argon, or a mixture of two or more such refrigerants onto the polymer mixture. While a gaseous refrigerant may also be used alone, the cooling efficiency is often too low. Additional wax crystal modifier polymer may be added at the inlet of pre-cooler 120. The total amount of wax crystal modifier polymer added in both coarse chopper 110 and pre-cooler 120 may range from 10% to 95% of the total polymer mixture by weight. The wax crystal modifier polymer added at the inlet to pre-cooler 120 may be powder or small beads ranging in size of 3 millimeters (⅛ inch) or less in diameter. Pre-cooler 120 reduces the temperature of the mixture to a temperature below the glass transition temperature of the ultra-high molecular weight polymer. This temperature is preferably below 130° C. (−202° F.), and most preferably below −150° C. (−238° F.). These temperatures may be produced by any known methods, but use of liquid refrigerant such as that consisting essentially of liquid nitrogen, liquid helium, liquid argon, or a mixture of two or more such refrigerants sprayed directly on to the polymer is preferred as the resulting atmosphere reduces or eliminates hazards that exist when small polymer particles are mixed with an oxygen-containing atmosphere. The rate of addition of the liquid refrigerant may be adjusted to maintain the polymer within the preferred temperature range.

After the polymer mixture is cooled in pre-cooler 120, it is transported to cryomill 130. Again, this transport may be accomplished by any typical solids handling method, but often by an auger or a pneumatic transport system. A liquid refrigerant may be added to cryomill 130 in order to maintain the temperature of the polymer mixture in cryomill 130 below the glass transition temperature of the ultra-high molecular weight polymer. In one embodiment of the invention, this liquid refrigerant is added to the polymer mixture at the entrance to cryomill 130. The temperature of the cryomill must be kept at a temperature below the glass transition temperature of the ultra-high molecular weight polymer. It is preferable to maintain the temperature of the cryomill between −130° C. to −155° C. (−202° F. to −247° F.). Cryomill 130 may be any of the types of cryomills known in the art, such as a hammer mill or an attrition mill. In an attrition cryomill, the polymer mixture is ground between a rapidly rotating disk and a stationary disk to form small particles between 10 and 800 microns in diameter. Partitioning agent may be added in cryomill 130 if required to prevent reagglomeration. However, it is preferred to avoid using partitioning agent in cryomill 130 to reduce the amount of inert material in the final suspension.

The small particles formed in cryomill 130 are then transferred to separator 140. Most of the liquid refrigerant vaporizes in separator 140. Separator 140 acts to separate the primarily vaporized refrigerant atmosphere from the solid polymer particles, and the larger polymer particles from the smaller polymer particles. Separator 140 may be any known type of separator suitable for separating particles of this size, including a rotating sieve, vibrating sieve, centrifugal sifter and cyclone separator. Separator 140 vents a portion of the primarily vaporized refrigerant atmosphere from cryomill 130, and separates particles into a first fraction with less than about 400 microns in diameter from a second fraction of those with diameters of about 400 microns and above. The second fraction of those particles of about 400 microns and greater is discarded or preferably returned for recycle purposes to the pre-cooler for re-grinding. The first fraction of those particles of less than 400 microns is then transported to mix tank 150. The 400 micron size for the particles is nominal and may vary or have a distribution anywhere from about 300 to about 500 microns depending on the type of separator, operating conditions, and the desired end use.

The small polymer particles (the first fraction) are mixed with a suspending fluid in mix tank 150 to form a suspending fluid/polymer particles mixture. The suspending fluid is any liquid that is a non-solvent for the wax crystal modifier polymer and the ultra-high molecular weight polymer. Water is most commonly used. For many other mixtures, lower carbon alcohols such as methanol, ethanol, or their mixtures with or without water, may also be used as the suspending fluid. Mix tank 150 may be any type of vessel designed to agitate the mixture to achieve uniform composition of the suspension fluid/polymer particles mixture, typically a stirred tank reactor. Mix tank 150 acts to form a suspension of the polymer particles in the suspending fluid. Other components may be added before, during, or after mixing the ground polymer particles with the suspending fluid in mix tank 150 in order to aid the formation of the suspension, and/or to maintain the suspension. For instance, gylcols, such as ethylene glycol or propylene glycol, may be added for freeze protection or as a density balancing agent. The amount of glycol added may range from 10% to 60% by weight of the suspending fluid, as needed. A suspension stabilizer may be used to aid in maintaining the suspension of the ultra-high molecular weight particles. Typical suspension stabilizers include talc, tri-calcium phosphate, magnesium stearate, silica, polyanhydride polymers, sterically hindered alkyl phenol antioxidants, and graphite. Partitioning agent added in coarse chopper 110 or cryomill 130 will often function as a suspension stabilizer as well. The total amount of partitioning agent/suspension stabilizer added may range from 0% to 40% of the suspending fluid, by weight, but is preferably between 5% and 25%, most preferably between 8% and 12%. A wetting agent, such as a surfactant, may be added to aid in the dispersal of the polymer particles to form a uniform mixture. Non-ionic surfactants such as linear secondary alcohol ethoxylates, linear alcohol ethoxylates, alkylphenol exthoxylates, and anionic surfactants, such as alkyl benzene sulfonates and alcohol ethoxylate sulfates, e.g., sodium lauryl sulfate, are preferred. The amount of wetting agent added may range from 0.01% to 1% of the suspending fluid by weight, but is preferably between 0.01% and 0.1%. In order to prevent foaming of the suspending fluid/polymer particle mixture during agitation, a suitable antifoaming agent may be used, typically a silicon oil based commercially available antifoam. Generally, no more than 1% of the suspending fluid by weight of the active antifoaming agent is used. Representative but non-exhaustive examples of antifoaming agents are the trademark of and sold by Dow Corning, Midland, Mich.; and Bubble Breaker products, trademark of and sold by Witco Chemical Company, Organics Division. Mix tank 150 may be blanketed with a non-oxidizing gas such as nitrogen, argon, neon, carbon dioxide, chlorofluorocarbons, such as those sold under the duPont trademark Freon®, hydrochlorofluorocarbons, such as those sold under the duPont trademark Suva®, or other similar gases, or the non-oxidizing gas may sparged into mix tank 150 during polymer particle addition to reduce the hazard of fire or explosion resulting from the oxidizing gas interaction with the small polymer particles possessing high surface area.

After the suspending fluid/polymer particle mixture is agitated to form a uniform mixture, a thickening agent may be added to increase the viscosity of the mixture. The increase in viscosity retards separation of the suspension. Typical thickening agents are high molecular weight, water-soluble polymers, including polysaccharides, xanthum gum, carboxymethyl cellulose, hydroxypropyl guar, and hydroxyethyl cellulose. Where water is the suspending fluid, the pH of the suspending fluid should be basic, preferably above 9 to inhibit the growth of microorganisms.

The product resulting from the agitation in the mix tank is a stable suspension of a drag-reducing polymer in a suspending fluid suitable for use as a drag-reducing agent. This suspension may then be pumped or otherwise transported to storage for later use, or used immediately.

The amounts of liquid refrigerant, wax crystal modifier polymer, suspending fluid, suspension stabilizer, partitioning agent, glycol, wetting agent, antifoaming agent, and thickener should be combined in effective amounts to accomplish the results desired and to avoid hazardous operating conditions. These amounts will vary depending on individual process conditions and can be determined by one of ordinary skill in the art. Also, where temperatures and pressures are indicated, those given are a guide to the most reasonable and best conditions presently known for those processes, but temperatures and pressures outside of those ranges can be used within the scope of this invention. The range of values expressed as between two values are intended to include the value stated in the range.

What is claimed is:

1. A method for the preparation of a drag-reducing polymer suspension comprising:
    (a) grinding an ultra-high molecular weight linear poly (α-olefin) with a wax crystal modifier polymer, wherein the wax crystal modifier polymer comprises one or more copolymers selected from the group condisting of a copolymer of an olefin and acrylonitrile, a copolymer of an olefin and vinyl acetate, a copolymer of an olefin, acrylonitrile and carbon monoxide, polyalkylacrylate; a copolymer of an olefin, vinyl acetate and carbon monoxide, a copolymer of an olefin and maleic anhydride, a copolymer of an olefin and an ester maleic anhydride derivative, and a copolymer of an olefin and an imide maleic anhydride derivative, at a temperature below the glass transition temperature of the ultra-high molecular weight linear poly(α-olefin) to form group polymer particles; and
    (b) mixing the group polymer particles with a suspending fluid to form the drag-reducing polymer suspension.
2. The method as described in claim 1, wherein the ultra-high molecular weight linear poly(α-olefin) is ground with the wax crystal modifier polymer in the absence of a partitioning agent.
3. The method as described in claim 1, further comprising prior to or simultaneous with step (a):
    cooling the ultra-high molecular weight polymer with a refrigerant.
4. The method as described in claim 3, wherein the refrigerant is one or more refrigerants selected from the group consisting of liquid nitrogen, liquid helium and liquid argon, or mixtures thereof.
5. The method as described in claim 1, wherein the ultra-high molecular weight linear poly(α-olefin) is ground at a temperature below −130° C.
6. The method of claim 1 further comprising after step (a) and before step (b):
    separating the ground polymer particles into a first fraction with a diameter of less than about 400 microns from a second fraction with a diameter of about 400 microns or greater; and
    regrinding the second fraction of the ground polymer particles with a diameter of about 400 microns or greater.
7. The method of claim 1 wherein the suspending fluid comprises water.
8. The method of claim 7, wherein the suspending fluid further containing one or more components selected from the group consisting of a wetting agent, an antifoaming agent, and a thickening agent.
9. The method of claim 7, wherein the suspending fluid further containing a suspension stabilizer.
10. The method of claim 1 wherein the wax crystal modifier polymer is added as a powder or small beads of 3 millimeters (⅛ inch) or less in diameter.
11. The method of claim 10 wherein the amount of the wax crystal modifier polymer added in the ratio of between 10%–95% wax crystal modifier polymer to 90%–5% ultra-high molecular weight linear poly(α-olefin), by weight of the total mixture.
12. A method for the preparation of a drag-reducing polymer suspension comprising:
    (a) cooling an ultra-high molecular weight linear poly(α-olefin) with a liquid refrigerant;
    (b) grinding the ultra-high molecular weight linear poly (α-olefin) with a wax crystal modifier polymer, wherein the wax crystal modifier polymer comprises one or more copolymers selected from the group consisting of a copolymer of an olefin and acrylonitrile, a copolymer of an olefin and vinyl acetate, a copolymer of an olefin, acrylonitrile and carbon monoxide, a polyalkylacrylate, a copolymer of an olefin, vinyl acetate and carbon monoxide, a copolymer of an olefin and maleic anhydride, a copolymer of an olefin and an ester maleic anhydride derivative, and a copolymer of an olefin and an imide maleic anhydride derivative, at a temperature below −130° C. to form ground polymer particles;
    (c) separating the group polymer particles into a first fraction with a diameter of less than about 400 microns from a second fraction with a diameter of 400 microns or greater;
    (d) regrinding the second fraction of the group polymer particles with a diameter of about 400 microns or greater;
    (e) mixing the first fraction of the group polymer particles with a diameter of less than about 400 microns with a suspending fluid to form the drag-reducing polymer suspension, wherein the suspending fluid comprises water and contains one or more components selected from the group consisting of a wetting agent, an antifoaming agent, and a thickening agent.

13. A drag-reducing polymer suspension comprising:
(a) an ultra-high molecular weight linear poly(α-olefin);
(b) a wax crystal modifier polymer, wherein the wax crystal modifier polymer comprises one or more copolymers selected from the group consisting of a copolymer of an olefin and acrylonitrile, a copolymer of an olefin and vinyl acetate, a copolymer of an olefin, acrylonitrile and carbon monoxide, a polyalkylacrylate; a copolymer of an olefin, vinyl acetate and carbon monoxide, a copolymer of an olefin and maleic anhydride, a copolymer of an olefin and an ester maleic anhydride derivative, and a copolymer of an olefin and an imide maleic anhydride derivative; and
(c) a suspending fluid.

14. The drag-reducing polymer suspension of claim 13 wherein the suspending fluid comprises water.

15. The drag-reducing polymer suspension of claim 13, wherein the wax crystal modifier polymer comprises one or more copolymers selected from the group consisting of copolymer of an olefin and acrylonitrile, a copolymer of an olefin and vinyl acetate, a copolymer of an olefin, acrylonitrile and carbon monoxide, a polyalkylacrylate, a copolymer of methacrylate and vinyl acetate, a copolymer of an olefin and vinyl acetate, a copolymer of an olefin, vinyl acetate and carbon monoxide, a copolymer of an olefin and maleic anhydride, a copolymer of an olefin and an ester maleic anhydride derivative, and a copolymer of an olefin and an imide maleic anhydride derivative.

16. The drag-reducing polymer suspension of claim 14, wherein the suspending fluid further comprises one or more components selected from the group consisting of a wetting agent, an antifoaming agent, and a thickening agent.

17. The drag-reducing polymer suspension of claim 13, further comprising a suspension stabilizer.

18. A drag-reducing polymer suspension comprising:
(a) an ultra-high molecular weight linear poly(α-olefin);
(b) a wax crystal modifier polymer, wherein the wax crystal modifier polymer comprises one or more copolymers selected from the group consisting of a copolymer of an olefin and acrylonitrile, a copolymer of an olefin and vinyl acetate, a copolymer of an olefin, acrylonitrile and carbon monoxide, a polyalkylacrylate; a copolymer of an olefin, vinyl acetate and carbon monoxide, a copolymer of an olefin and maleic anhydride, a copolymer of an olefin and an ester maleic anhydride derivative, and a copolymer of an olefin and an imide maleic anhydride derivative;
(c) water;
(d) wetting agent;
(e) an antifoaming agent;
(f) a thickening agent; and
(g) a suspension stabilizer.

* * * * *